Oct. 12, 1926.
F. O'NEILL
1,602,926
GLASS FORMING APPARATUS
Original Filed August 19, 1918  8 Sheets-Sheet 4
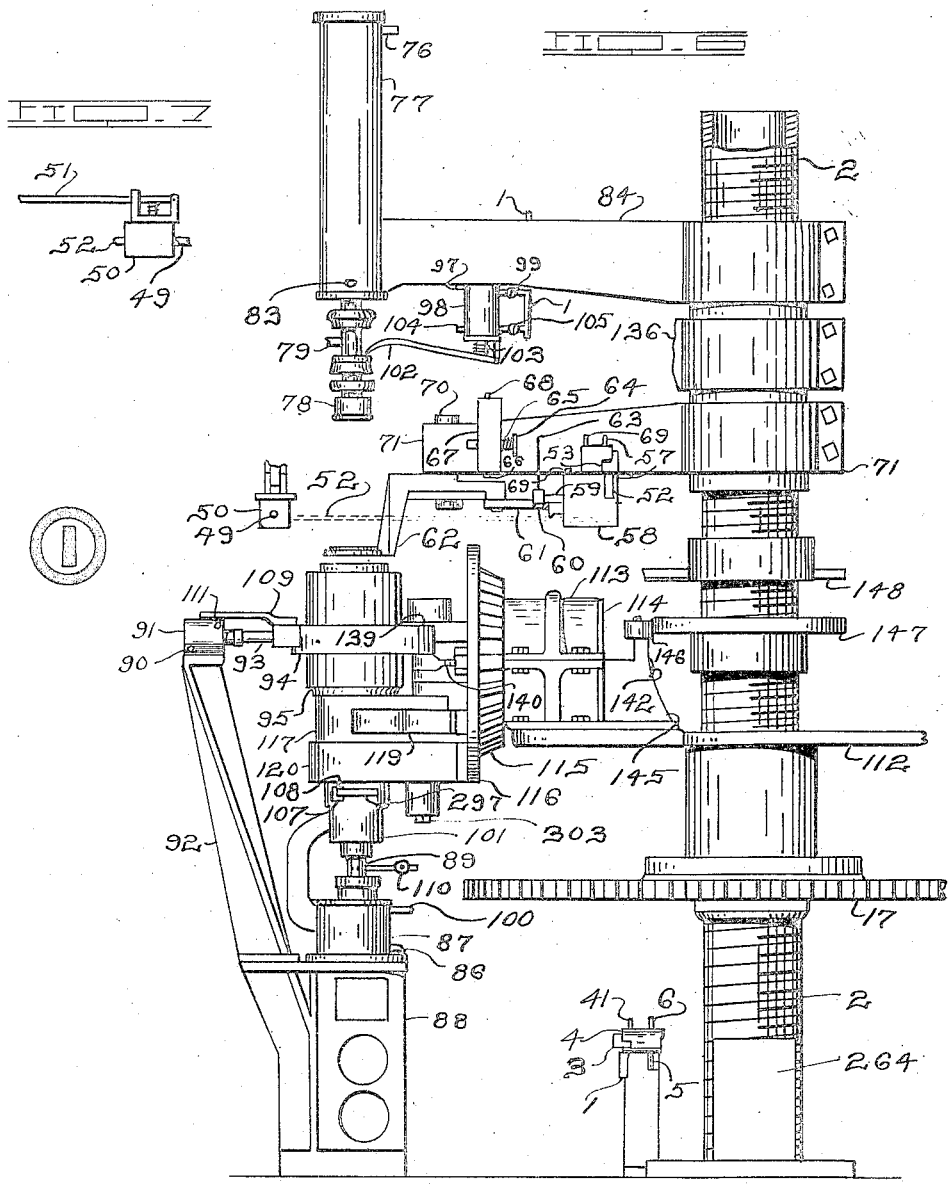
Frank O'Neill
INVENTOR
BY
Geo E Kirk
ATTORNEY Oct. 12, 1926.
F. O'NEILL
1,602,926
GLASS FORMING APPARATUS
Original Filed August 19, 1918     8 Sheets-Sheet 5
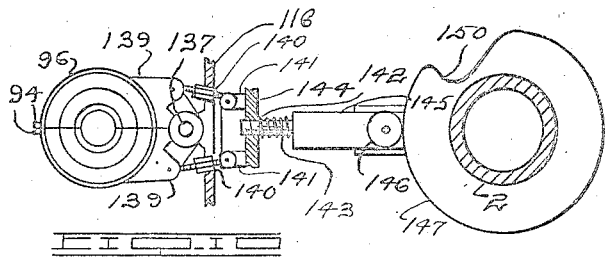
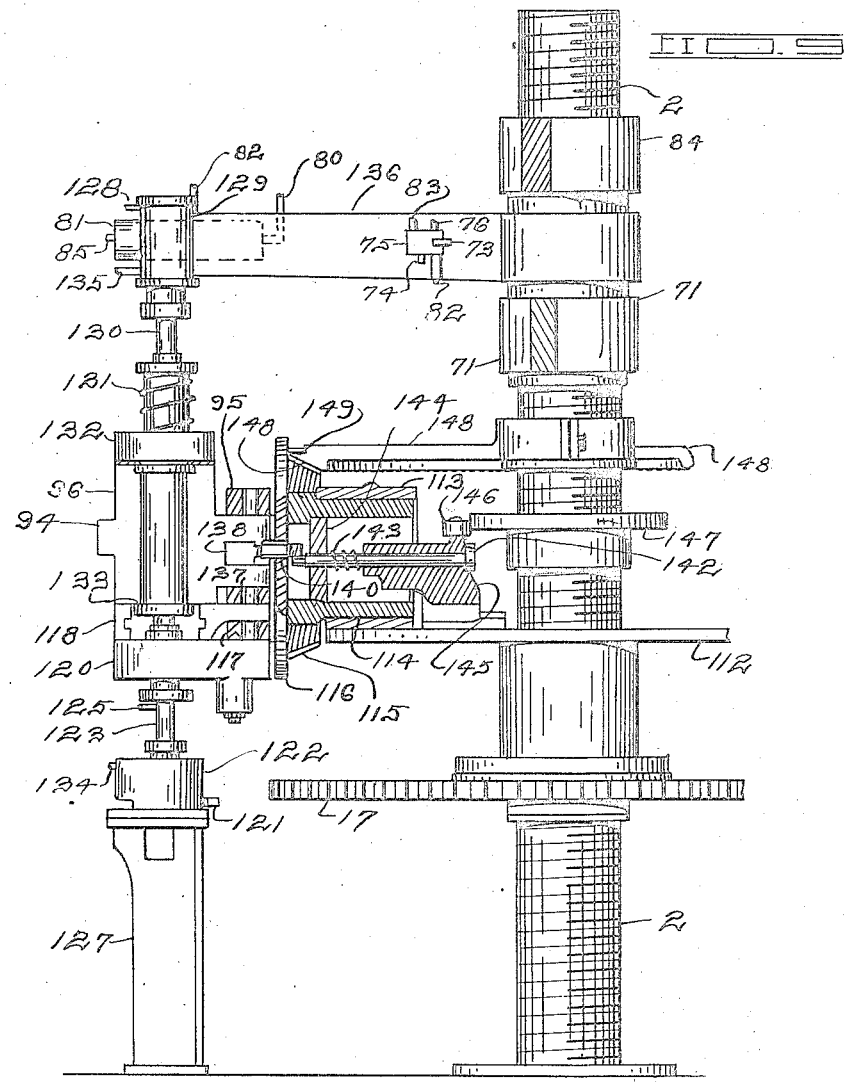
Frank O'Neill
INVENTOR
BY
Geo. E. Kirk
ATTORNEY

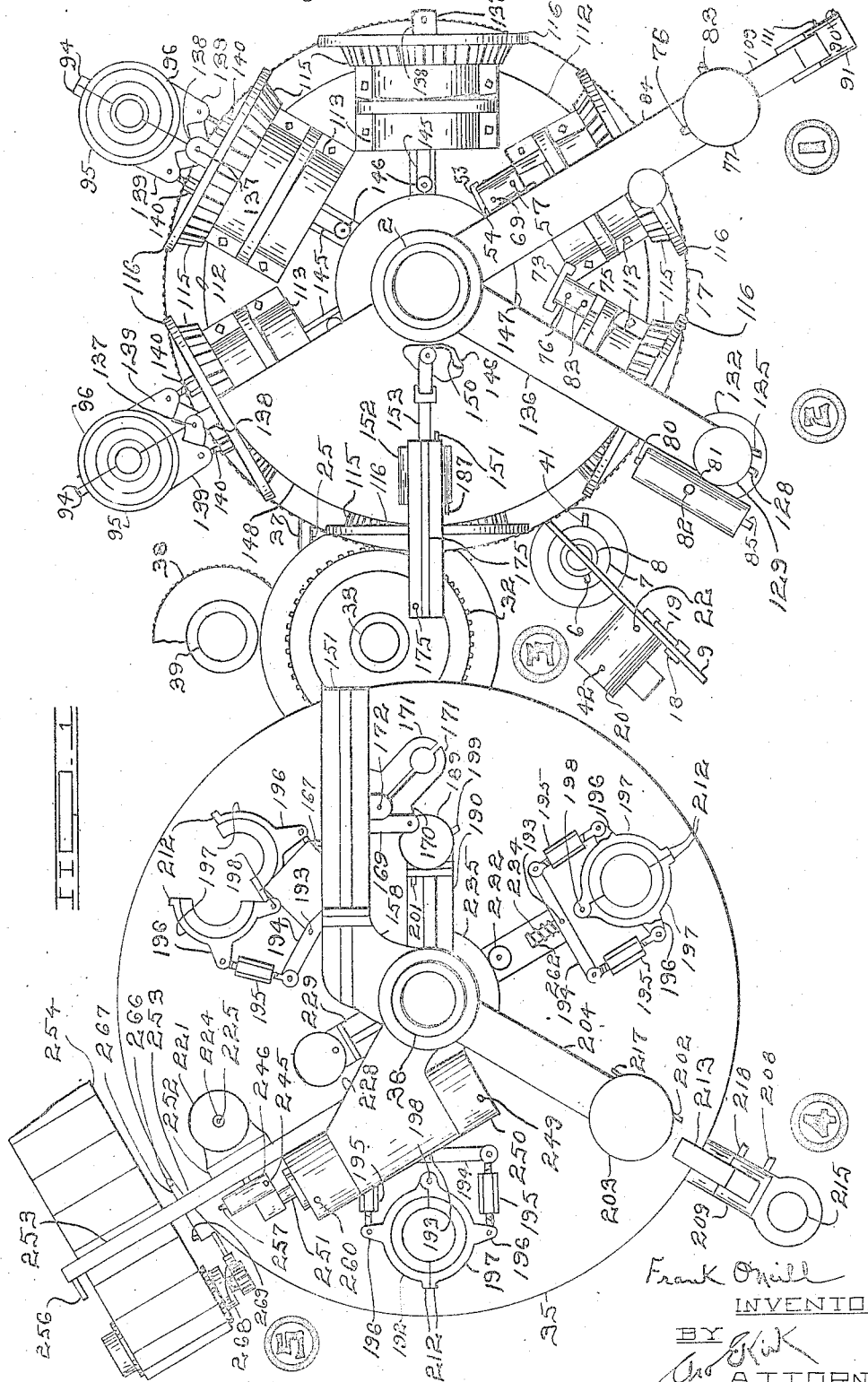

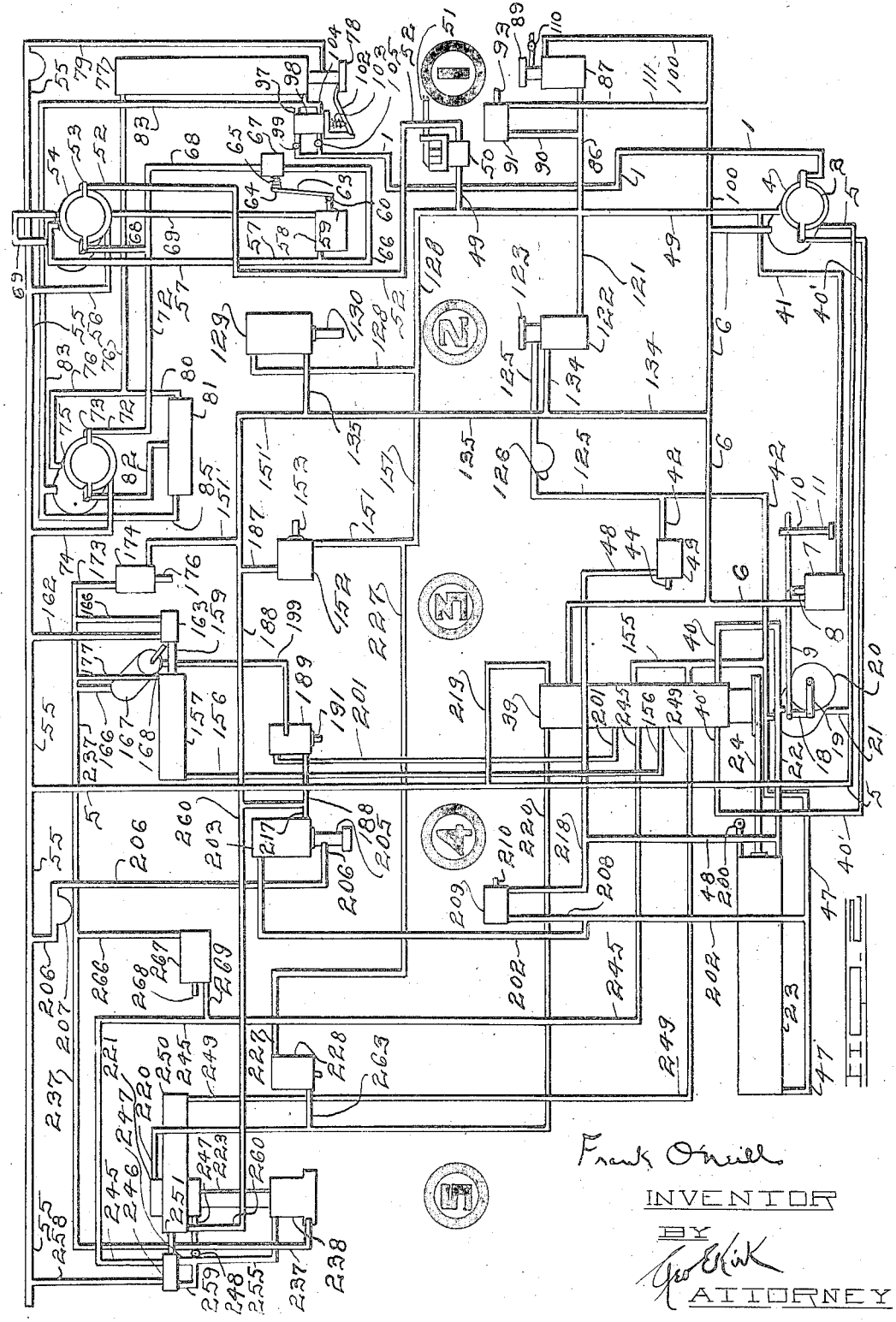

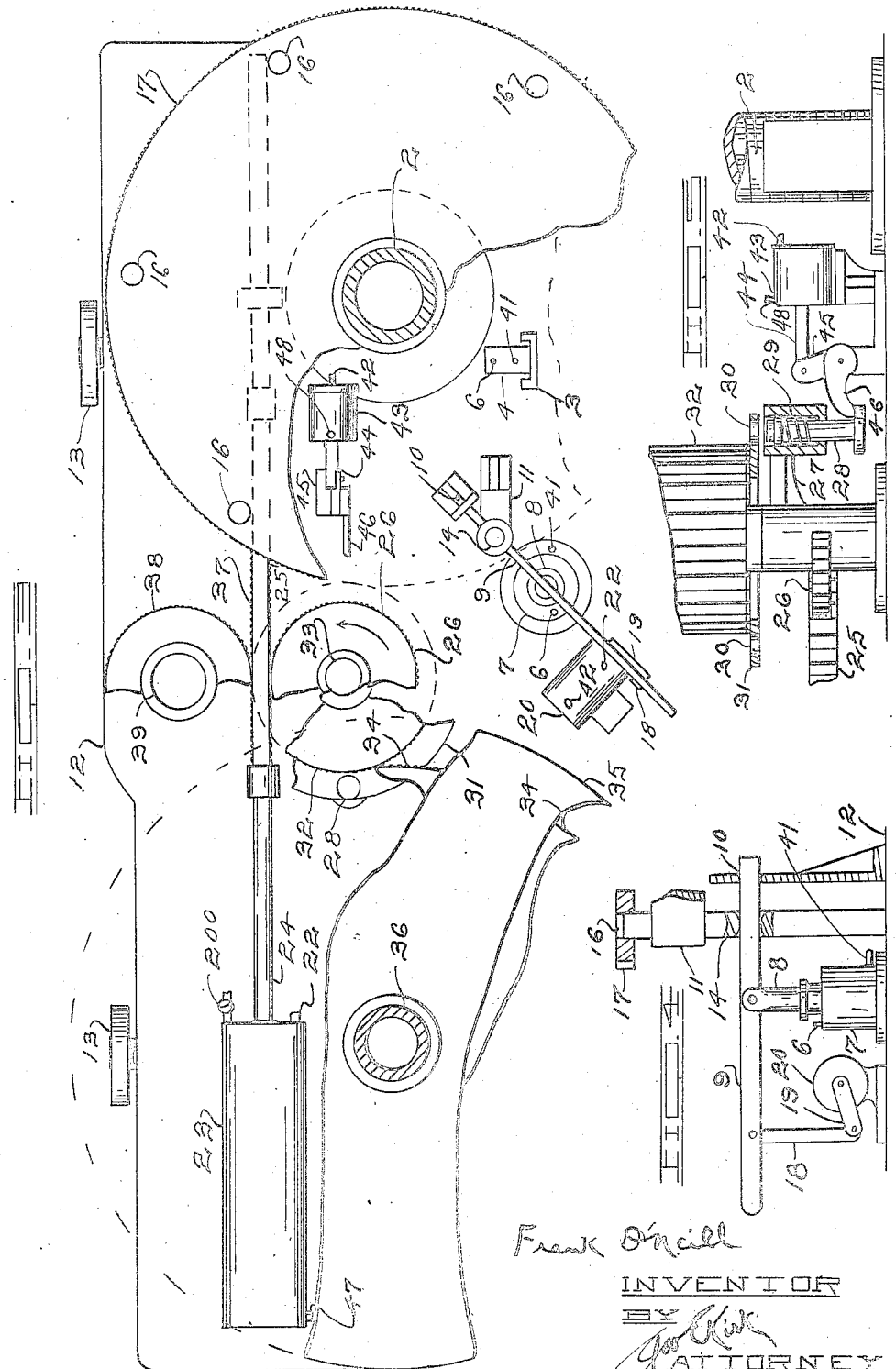

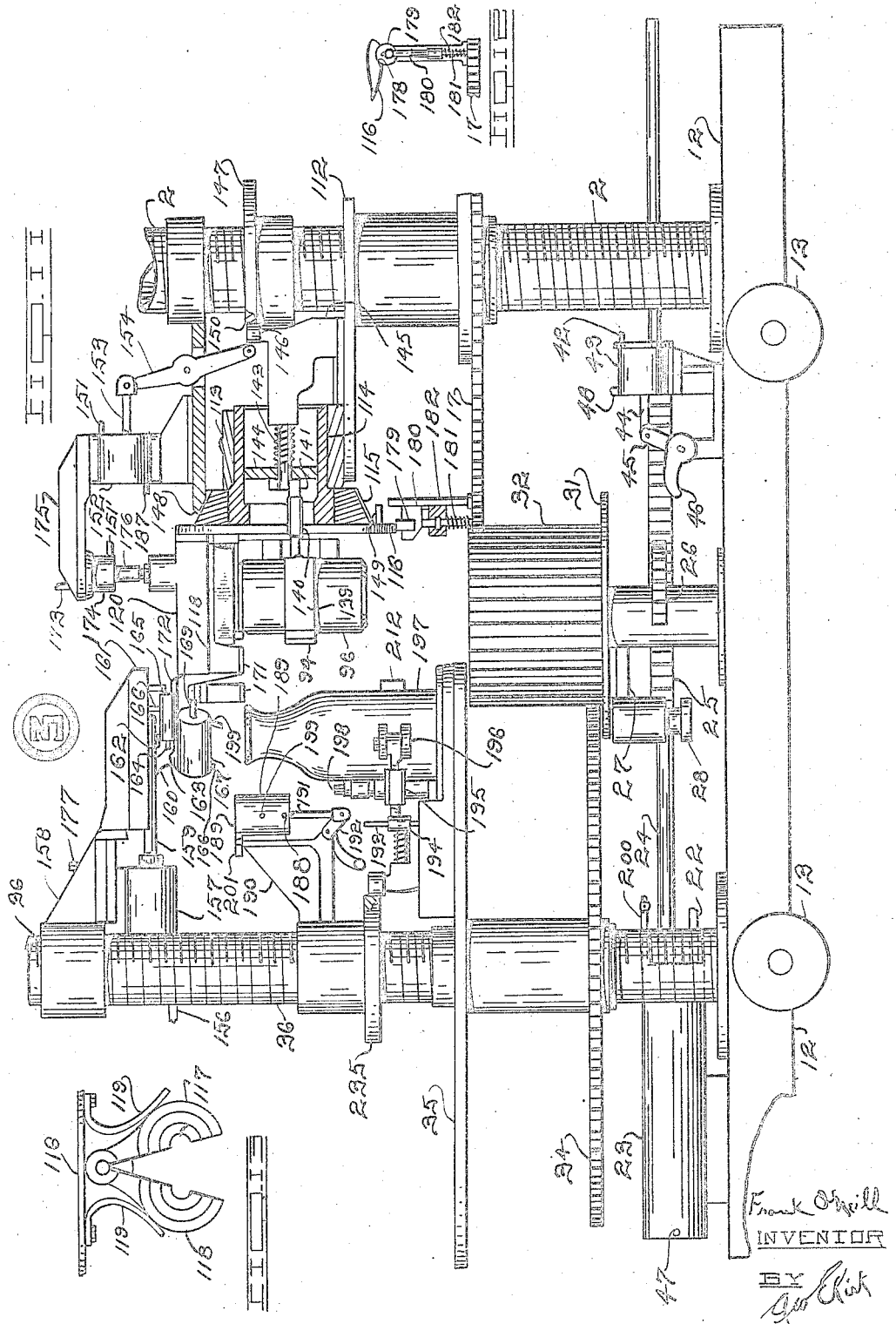

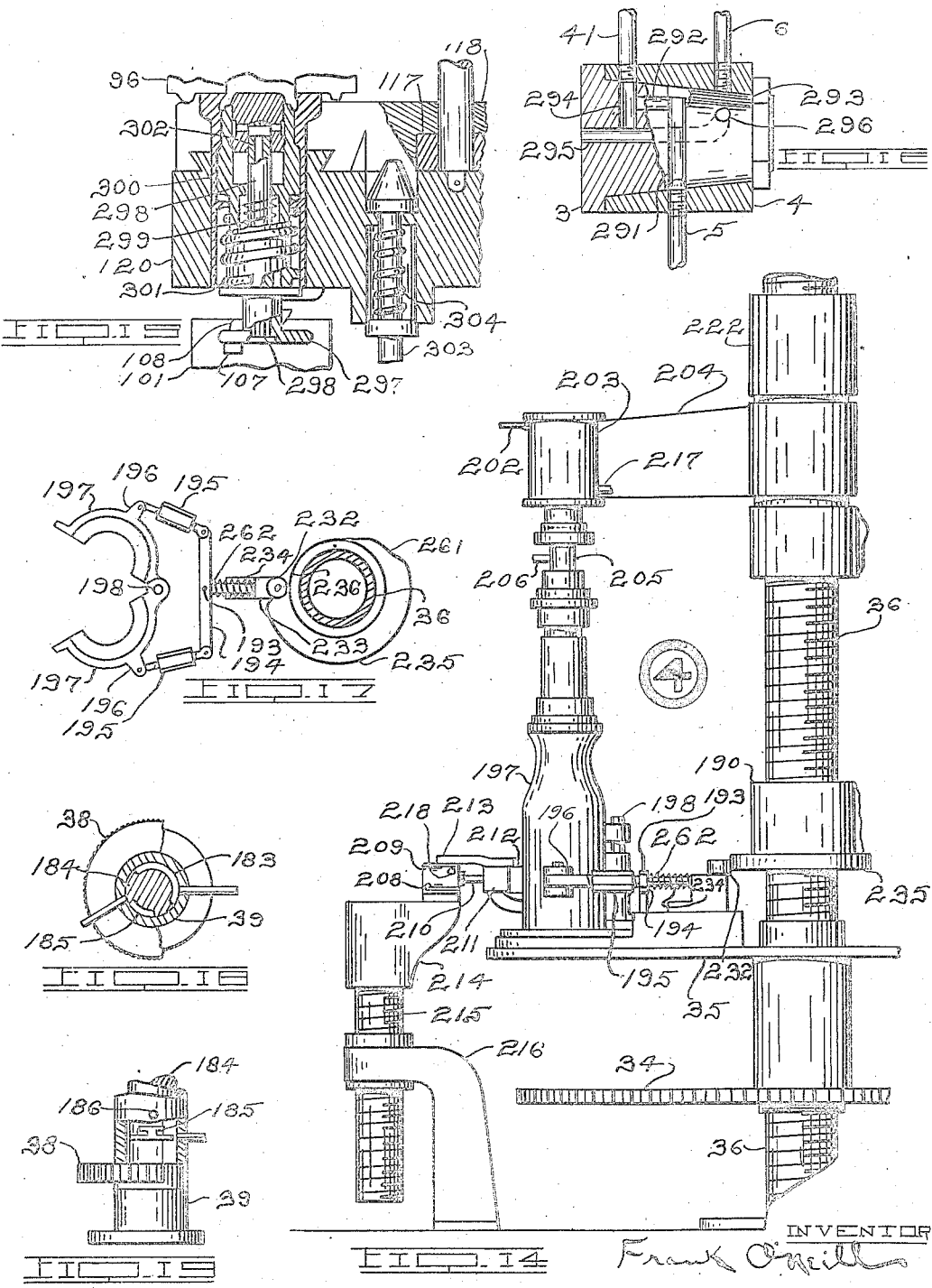

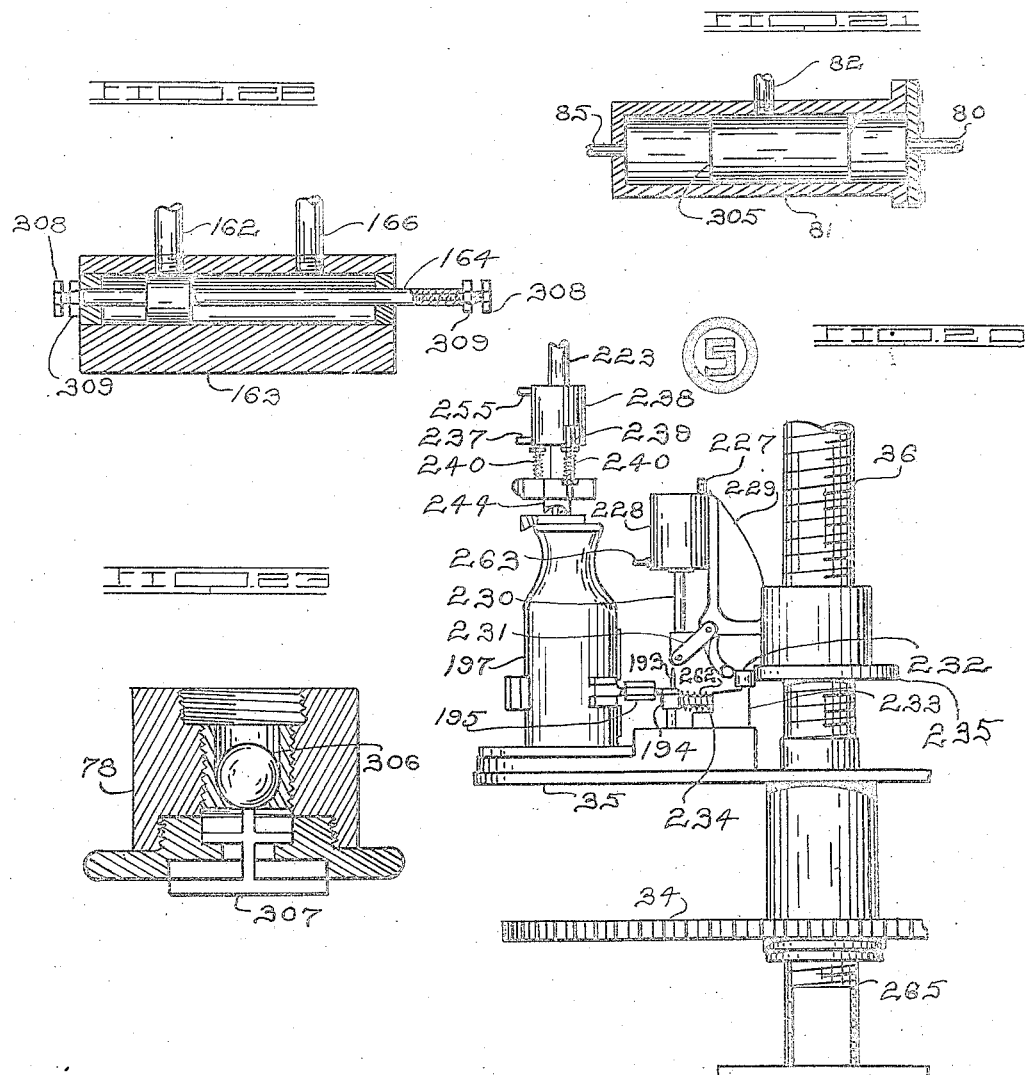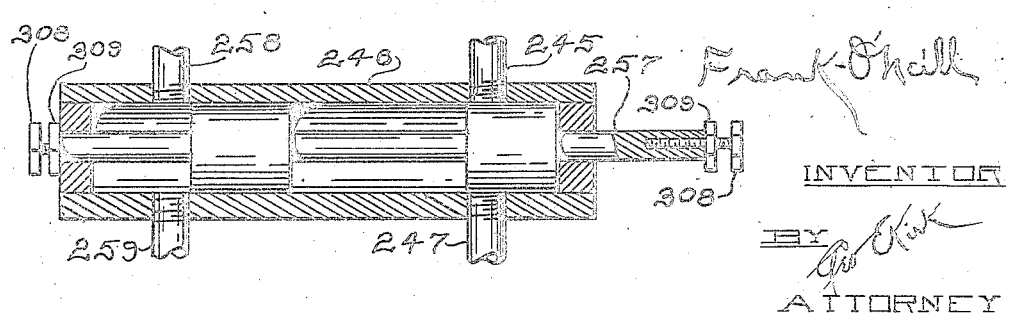

Patented Oct. 12, 1926.

1,602,926

UNITED STATES PATENT OFFICE.

FRANK O'NEILL, OF TOLEDO, OHIO.

GLASS-FORMING APPARATUS.

Original application filed August 19, 1918, Serial No. 250,488. Divided and this application filed January 10, 1922. Serial No. 528,264.

This invention relates to the control in determined sequence of various devices in series providing an automatic complete apparatus, as for performing successively operations upon a substance, herein shown as the shaping of molten glass into ware.

This invention has utility when incorporated in apparatus for the production of hollow ware, as glass bottles.

Referring to the drawings:

Fig. 1 is a fragmentary plan view of an embodiment of the apparatus in an automatic bottle making machine, with circle notation of the subdivision of operations herein grouped as generally occurring at five stations;

Fig. 2 is a pneumatic power diagram of the apparatus, with circle notations for the stations as appearing on Fig. 1;

Fig. 3 is a fragmentary plan view of the apparatus, parts being broken away, to show the table or platform driving mechanisms;

Fig. 4 is a detail view, in elevation, parts being broken away, of the table release or lock bar device;

Fig. 5 is a fragmentary view of the drive unclutching device;

Fig. 6 is a fragmentary elevation of the first or charging table, showing the control connection at the charging or first station;

Fig. 7 is a detail, at right angles to the showing in Fig. 6, of the main or starting valve;

Fig. 8 is a perspective view of the guide below the charging station;

Fig. 9 is a fragmentary elevation of the first table with the associated mechanisms at the blank forming or second station;

Fig. 10 is a plan of the blank mold with the associated closing cam in the position of the second station, Fig. 9;

Fig. 11 is a fragmentary side elevation of the blank and finish tables at the third or transfer station, the associated mechanisms being shown;

Fig. 12 is a detail view of one of the yieldable holding devices assisting in maintaining the blank mold sections in vertical position when away from the segment control adjacent the transfer station;

Fig. 13 is a fragmentary plan view of the neck finish or blank holding sections open for blank discharge therefrom;

Fig. 14 is a fragmentary side elevation of the second or finish mold table at the fourth or final blowing station, with showing of the associated mechanisms;

Fig. 15 is a section through the neck finish plunger, showing its mounting and control features;

Fig. 16 is a sectional view of a rocker valve as variously incorporated in the power system of the apparatus of this disclosure;

Fig. 17 is a plan view of the finish mold sections as opened up at the take-off station;

Fig. 18 is a section horizontally through the distributing valve, which controls the sequence for power air flow for certain of the mechanisms of the apparatus;

Fig. 19 is a fragmentary side elevation of the distributing valve of Fig. 18;

Fig. 20 is a fragmentary side elevation of the second or finish mold table at the fifth or take-off station, parts being broken away;

Fig. 21 is a section through the retarding valve;

Fig. 22 is a longitudinal section through the valve carried by the transfer slide;

Fig. 23 is a section through a blow head, showing the automatic check valve therein; and Fig. 24 is a longitudinal section through the valve carried by the take-off slide.

In the practice hereunder, especially involving this disclosure for the manufacture of hollow glassware, as bottles, the work may be shown as automatically progressing in a mechanical sequence as timed by the charging or gather of molten glass supplied to the mechanism.

While the number of stations and character of work performed thereat may be varied to meet convenience and the requirements of the output, as a simple apparatus conforming to a wide range of commercial demands, the disclosure herein is presented as embodying intermittent driving in 60° steps at the charging table or platform with the final mold table or platform operating in synchronism therewith as to the same angular travel steps.

The operations as grouped involve the supply of molten glass with operation of a trip to effect shearing off or separation of such supply, with the packing of such supply down into a blank mold and the neck finish formed thereon. From this first station there is a 60° travel to the second station where the packed down glass is blown back up from the neck finisher end thereof.

In the travel from the second station to the third station, the blank mold, together with its semi-formed charge of still plastic glass, is oriented to bring the neck finish end up at 120° from the charging station. Opening of the blank mold occurs here, with a tardy release of the neck finish as the final mold from the second table, or mechanism from the second or finish table, engages the blank and withdraws it to position in the finish mold on the second table.

The second or finish table rotates clockwise, as does the first table, and in synchronism as transmitted by the intermediate driving gear. From this third or transfer station the blank is carried in the finish mold 120° or two steps of 60°, to the fourth station for final blowing to complete the form of the charge. While the charges at station one may be even in excess of fifteen per minute, the idle stations permit sufficient setting of the ware to retain superior form for uniformity in a high grade output. From this fourth station or final blowing to shape, the ware has a travel of two 60° steps to the fifth station where the formed ware may be removed from the finish mold and deposited away from the apparatus, as on a traveling conveyor.

The travel or drive stage, in so far as it is common for recurrence at each 60° step, is given first complete description. The practice of the invention as disclosed has its power actuation and sequence largely incident to motive fluid control, and such may be compressed air.

The release of the apparatus is brought about (Figs. 2, 3, 4,) by flow of air in duct 1 from down in column 2 of the first table to tilt rocker 3 so that valve 4 may permit flow of power air from line 5 past the valve 4 of the general type of the valve shown in my Patent 1,217,102, February 20, 1917, and thence through duct 6 to the upper end of cylinder 7. This moves piston rod 8 downward in the vertical cylinder 7 to pull downward bar or lever 9 having a fixed fulcrum or bearing 10 mounted on base or truck body 12 (Figs. 3, 11) having wheels 13 permitting ready shifting of the apparatus. The lever 9 passes through vertical bar 14, which bar 14 is guided by a bracket 11. The downward pull of the piston rod 8 moves the bar or lever 9 to actuate the vertical bar 14 downward, thus withdrawing the bar 14 from opening 16 in gear 17 rotatable on the column 2.

The driving of the released apparatus may now be effected automatically, for the lever 9 in its travel, has link 18 connected to arm 19 for rocking valve 20. Thus power air from line 5 may pass by way of line 21 through the valve 20 and line 22 for drawing into power cylinder 23 its piston rod 24. The piston rod 24 from this main horizontal drive cylinder, carries a rack having teeth 25 in mesh with a half gear or segment 26. This segment gear 26 has oppositely extending therefrom an arm 27 carrying a pin 28 normally thrust upwardly by a helical spring 29 (Fig. 5) to enter opening 30 in flange extension 31 carried by a long toothed intermediate driving gear 32 mounted on shaft 33 coaxial with the segment 26.

The pin 28 (Fig. 3) is in starting position, having snapped up into register with the opening 30, so that in the inward travel of the piston rod 24 as to the cylinder 23, the driving travel of the segment 26 is counterclockwise to the position shown in Fig. 5 and the gear 32 is rotated therewith 180°. The intermediate gear 32 in this travel, on one side is in mesh with the gear 17 rotatably mounted on the column 2, while on the opposite side, the gear 32 is in mesh with a gear 34 rotatably mounted on a second column 36 (Figs. 3, 11) to drive the finish table or platform 35.

Opposite the rack 25 of the extension of the piston rod 24 is rack 37 in mesh with half gear segment 38 for giving alternating rotary travels of 180° to distributing valve 39, such travels being clockwise in the first or table driving stroke of the piston rod 24, and the reverse or counter-clockwise in the recover travel stroke of the rod 24.

Inasmuch as the 60° forward step of the gear 17 clockwise as well as the simultaneous clockwise 60° step of the table 35 in each instance after the charging pause, is to be followed by another step in the same direction, and such continued, there is not driving travel of the piston rod 24 but only upon the inward stroke does the rod 24 drive the table gears 17, 34. To bring this about, properly timed sequence of air flow occurs from the distributing valve 39 as supplied from the line 22 when the rod 24 nears the end of its inward stroke. This air from the distributing valve 39 flows by line 40 thereto and thence by line 40' to reset the rocker 4, permitting power fluid flow from the line 5 to be cut off from the line 6, but allowing flow from the valve 4 by way of line 41 to the lower end of the vertical cylinder 7 on the truck 12, giving an upward thrust to the piston rod 8, lever 9 and lock bar 14 to have the lock bar 14 engage a recess or opening 16 in the gear 17, thus holding the table rotating on column 2 with the gear 17 against travel.

This movement of the lever 9 also acts through the link 18 and the arm 19 to cause the valve 20 to cut off power air from the line 22, but simultaneously supply power air from the line 21 to line 42 extending to cylinder 43, thrusting its horizontal piston rod 44 outward (Figs. 3, 5, 11). This piston rod 44 is connected to angle lever arm 45, the other arm 46 of which angle lever in this thrust of the rod 44 strikes the head of the pin 28, withdrawing such pin against the action of the spring 29 from the hole 30 in the flange 31, thus unclutching the gear 32 for idle recovery of the segment 26 to bring the pin 28 into the diametrically opposite hole 30 of the flange 31 for the next drive.

Simultaneously with this tripping or unclutching of the pin 28 for releasing the segment 26 from driving the intermediate gear 32, line 47 is supplied with power air from the line 42 (Figs. 2, 3, 11). This duct 47 extends to the opposite end of the cylinder 23 from the line 22, and thus causes a thrusting of the piston rod 24 outward. In this recover or idle travel interval, the segment 38 reverses the oscillation of the distributing valve 39, while the segment 26 traveling independently of the gear 32, swings the pin 28 to ride around on the underside of the flange 31 as it leaves the arm 46 and is thrust upward by the spring 29, until the pin 28 enters the diametrically opposite opening 30 in the flange 31 and is thus automatically clutched to the intermediate gear 32 for a repetition of this cycle of driving operations as recurring between each 60° station of the tables at each charge of molten glass at the first station. Before the succeeding inward travel of the piston rod 24 can throw the gear 32 the next 180° air duct or line 48 from the line 22 causes a resetting of the arm 46 upward clearing the way for the pin 28 to make its full swing, for the air from the line 48 forces the piston rod 44 inward as to the cylinder 43 and the path is clear for the pin 28 to come to gear engaging position.

Considering the step travel as described as bringing the gear 17 to a position at the charging station for a supply of molten glass, reference may be had to Figs. 2, 6, as to the series of operations and their sequence as occurring during the stop interval of the gear 17 at the first station.

Air line 49 from the line 41 extends to valve 50 which may be conveniently opened upon delivery of the charge of molten glass from the gather to the apparatus, as by a slight movement of the glass charge carrying punty to bear downward on lever 51 from valve 50 (Fig. 7). Power air is thus allowed to pass the main or starting valve 50 and flow by line 52 to operate rocker 53 of valve 54, thereby permitting supply of power air from line 55 to pass by way of line 56 and the valve 54 to line 57 leading to horizontal shear cylinder 58 for thrusting forward its piston rod 59 extending to crosshead 60 having linkage 61 connected to shear 62 to sever the determined quantity of molten glass from the punty.

The crosshead 60 carries an upstanding pin 63, which in the outward travel of the piston rod 59, strikes horizontal pin 64, normally thrust theretoward by a spring 65. This movement of the plunger pin 64 against the resistance of the spring 65, by the pin 63, permits flow of power air from the duct 57 by branch line 66 past valve 67 carrying the pin 64, and thence through line 68 to cause a return of the shear rocker 53 to initial position. This permits flow of power air from the line 56 past the valve 54 through line 69 to the outer end of the horizontal shear cylinder 58, effecting a withdrawal of the piston rod 59 into this cylinder, with an opening of the shear 62 on its fulcrum 70 carried by the arm 71 extending radially from the column 2 adjacent the first station. In this opening of the shear 62, the pin 63 on the crosshead 60 moves away from the pin or plunger 64, and the spring 65 automatically resets the valve 67.

The power air from the valve 54 effecting the closing of the shear 62 and thence passing through the valve 67 to the line 68 has branch line 72 from the duct or line 68. This line 72 extends to tilt rocker 73 at station two (Figs. 2, 6, 9), so that power air from the line 55 may flow by way of line 74 past valve 75 through line 76 to the upper end of vertical plunger cylinder 77, thereby forcing head 78 downward at station one, in order that the valve therein unseated by contact with the charge receiving mold therebelow, may permit flow of power air from the line 55 past a reducing valve through a flexible line 79 and the head 78 to pack the charge of molten glass downward into the charge receiving mold. This packing down operation is automatically of the desired brief interval of time as determined by the charge volume and the character of the ware being produced.

The line 76 from the valve 75 has a branch line 80 extending to a retarding valve 81 at station two. The delayed flow therefrom is by line 82 to reset the rocker 73, thus cutting off power air flow from the duct 76 and simultaneously allowing power air flow from the valve 75 by way of line 83 to the lower end of the vertical cylinder 77 at station one. The head 78 at once moves upward. As soon as this head 78 leaves the charge receiving mold, the valve in the head 78 closes to preclude further flow from the line 79.

The valve 98 and the cylinder 77 are mounted on radial arm 84 carried by the column 2 above the shear arm 71 and at station one. A branch 85 of the line 83 affects resetting of the retarding valve 81.

The power air line 49, which when the platforms are at rest supplies the flow to initiate travel in due sequence after passing the valve 50, has a branch line 86 to cylinder 87 at station one on bracket 88 (Fig. 6). This vertical cylinder 87 thus has neck finish plunger 89 therein forced upward. A branch line 90 from the line 86 (Fig. 2) extends to the charging station horizontal clamp cylinder 91 carried by auxiliary bracket 92 (Fig. 6) mounted on the bracket 88. This air from the line 90 forces clamp or holder piston 93 out of the cylinder 91 and radially inward towards the column 2 for embracing lugs 94 on the pair of blank mold sections 95, 96.

In the interval of the travel of the head 78, and properly timed therewith, according to the character of the ware, the neck finish, in the instance of bottle manufacture, may be formed. To this end the line 83 has branch line 97 (Figs. 2, 6) extending to vertical trigger valve 98 mounted on the arm 84 adjacent the cylinder 77 at station one. With cut off valve 99 open, air flow from the top of the valve 98 may occur at once, since the plunger head 78 is lowered. This flow from the valve 98 is through the line 1 to the lower rocker 3 to permit a resetting thereof and allow air flow from the line 5 past the valve 4 to the line 6, not only to release the first table gear 17 by moving the piston rod 8 into the vertical lock bar cylinder 7, but by branch line 100 to the top of the cylinder 87 withdrawing the plunger 89 downward into guide 101 (Fig. 6). For more retarded withdrawal of this neck finish plunger 89, the cut off valve 99 at the valve 98 may be closed. Then when the plunger 78 approaches the top of its return stroke, trigger 102 is moved upward against the resistance of spring 103 to shift the valve 98 to permit air flow by way of line 104 from the line 83 to the valve 98 and from thence past the open cut off valve 105 to the line 1. The spring 103 opens the valve 98 for flow past the valve 99 as the head 78 lowers away from the trigger 102, so when the head 78 is to move upward by air in the line 83, the valve 99 may be opened for early withdrawal of the neck finish plunger 89, or the valve 99 may be closed and the valve 105 opened for more retarded withdrawal of the neck finish plunger 89. In this latter instance the plunger 89 has the power air supply started theretoward when the head 78 is fully withdrawn.

There project counter-clockwise from seat 106 in the top of the guide 101 at station one, projections or auxiliary guides 107, 108 (Figs. 6, 8), insuring proper vertical positioning of the traveling parts in moving to station one over the plunger 89. As a steady or guide for the clamp head 93, there is provided overhanging arm 109. For puffing soft glass in instances where desired, so it may not fall before reaching the next station during the interval the plunger 89 is away from the inner side of the finished neck, valve 110 may be open to permit flow of air through the neck finish plunger 89 as it is withdrawn.

The mold sections 95, 96, are firmly held at station one and in closed position for the action of the head 78 in forcing the charge of molten glass into the lower portion of the blank mold, while the neck finish plunger 89 has duly acted upwardly. The line 100 has a branch line 111 to the inner or piston rod end of the horizontal clamp cylinder 91, thus withdrawing the plunger 93 in proper season for releasing the blank mold sections from the clamped held position at station one after the packing down of the charge and the completion of the neck finish operations.

Carried by the column 2 to rotate thereon with the gear 17 is the first table or platform 112 which has at 60° intervals radially extending housings or bearings 113 for barrels of rotatable members 114 carrying on the outer ends thereof bevel gears 115 adjacent disks 116 upon which the blank mold sections 95, 96, are pivotally mounted to swing from open to closed position. There is also pivotally mounted on the disks 116, neck finish mold sections 117, 118 (Fig. 13), normally held closed by leaf springs 119. Adjacent the neck finish sections and on the opposite side thereof from the blank mold sections 95, 96, is the member 120 rigid with the disk 116.

The sequence of operations following the withdrawal of the lock bar from the gear 17, rotates the table 112 clockwise 60° to bring the mold sections 95, 96, just charged at station one, with their carrying disk 116, to station two, where the mold sections are held closed and a blowing up for partial forming of the charge of molten glass into a blank may occur.

The timing and blowing back up for expanding the molten glass blank occurs automatically. The air duct 49 from the lower rocker valve 4 (Figs. 2, 9) has branch line 121 to the loose end of vertical cylinder 122 for forcing upward its plunger 123 toward the member 120, traveling with the disk 116 for unseating the valve in the plunger 123. This unseating of the valve in the plunger 123 permits flow of power air from the duct 42 leading from the lock bar rocker valve 20 to be properly timed with the rest period of the platform 112, so air may flow to flexible line 125 and through reducing valve 126 to blow the packed down molten glass back up in the blank mold sections 95, 96, for expanding the blank. This blowing into the blank from the plunger 123 is through the finish or formed neck in the mold sections 117, 118, above the member 120. The vertical cylinder 122 is mounted on a bracket 127 (Fig. 9).

Before this blowing of the blank back up occurs, there is a firm holding of the mold sections 95, 96, from above, for power air from the lower rocker valve 4 by way of the line 49 flows into branch line 128 (Figs. 2, 9) to the upper end of cylinder 129. This forces plunger 130 therein downward so a helical spring 131 may yieldably hold embracing head 132 over the pair of closed mold sections 95, 96. The neck finish sections 117, 118, are slightly embraced by the sections 95, 96, and so positively held closed here at station two as also at station one. In Fig. 9 the neck finish is shown as a lip 133 upon the usual type of milk bottle, the mold sections 95, 117, being removed with the hinge portions thereof shown in section.

From the lower rocker valve 4, timed with the withdrawal of the lock bar 14 by power air flow through the line 6, this line 6 has branch line 134 (Figs. 2, 9) to the upper end of the lower vertical cylinder 122 at station two, mounted on the bracket 127. This supply of power air withdraws the plunger 123 simultaneously with the withdrawal of the plunger 89 at station one. As the plunger 123 moves downwardly to clear the member 120, the valve in the plunger 123 automatically seats to preclude escape of blowing air from the line 125.

The line 134 extending to the lower vertical head 122 to withdraw or lower the plunger 123, has a branch line 135 to the lower end of the upper vertical cylinder 129 at station two, to lift the holder of head 132 clear of the sections 95, 96. The valves 75 and 81 and the cylinder 132 are carried by radial arm 136 at station two, clamped to the upper threaded portion of the column 2 between the arms 71 and 84.

At the charging station, as well as at the blow back up station on table 112, the mold sections 95, 96, for the blank are normally held in closed position respectively by the clamp 93 and the holder 132. These mold sections 95, 96, as also the auxiliary neck finish mold sections 117, 118, are mounted on pivot pin 137 (Figs. 9, 10), carried by a lug 138 (Fig. 1) projecting from the face of the disk 116. Each mold section 95, 96, has laterally of its hinges, an ear 139 from which extend adjustable links 140 to ears 141 on a disk 144 in the barrel or bearing 114. This disk 144 is fixed on a rod 142 surrounded by a helical spring 143, normally reacting between the disk 144 and a slide 145. This slide 145 in which the rod 142 is rotatably mounted, carries a roller 146 abutting nonrotary cam 147 fixedly mounted on the column 2.

Mounted on the column 2 and of about 120° angular extent clockwise from adjacent the blow back up station, is a segment 148 for engaging the bevel gears 115. In the travel from this station two where the mold blank is blown, a pin 149 (Fig. 9) carried by the disk 116, is first struck by the segment 148, giving a definite tooth engagement for the clockwise orienting of the disk 116, 180° in the next 60° turn or step of the table 112, thus positively bringing upward the neck finish end of the blank mold. In this turning operation, the disk 144 causes the rod 142 to rotate in the slide 145.

At the end of this second 60° step from the charging station, the cam 147 (Fig. 10) has a short radius portion 150. In reciprocation of the slide 145 radially, its action is positive in its inward travel to effect opening of the blank mold sections 95, 96, while in its direction of outward travel toward mold closing position, the spring 143 makes this throw action yieldable.

As the mold charged with a blown blank reaches the end of the second step of 60° from the charging station, or arrives at station three, the short radius portion 150 of the cam 147 as a fixed guide is in radial alignment with the roller 146 of the slide 145. From the lower rocker valve 4 and timed with the engaging of the lock bar 14, the lines 49, 128 (Figs. 2, 11) permit power air flow by line 151 to the inner end of horizontal cylinder 152 mounted on the segment at station three, to draw its piston rod 153 into said cylinder 152, thus rocking a lever 154 mounted on the segment 148. This lever 154 extends downward through the segment 148 to have its lower end engage the roller 146, thrusting such roller into the short radius portion 150 of the cam or guide 147, thus positively opening the lower or main blank mold sections 95, 96.

In order that there may be timing thereof during the idle or recover travel of the piston rod 24, the line 42 has a branch line 155 to the distributing valve 39, and air flow therefrom in determined sequence may accordingly occur while the platforms are at rest, as by way of line 156 (Figs. 2, 11) to horizontal cylinder 157 carried by bracket 158 upon the column 36 above the second table 35. This supply of air by the duct 156 to the cylinder 157 thrusts piston rod 159 outward and thus slides block 160 radially away from the column 36 in the guide 161.

In sequence after this throw by the cylinder 157, power air from the line 55 may flow by flexible line 162 (Figs. 1, 2) to valve 163 carried by the block 160. At the outward limit of travel of this block 160, plunger 164 strikes abutment 165 thus opening the valve 163 for air flow therefrom by line 166 to cylinder 167 carried by the block 160. This line 166 to the head end of the cylinder 167 causes piston rod 168 to move out of the cylinder 167 and to operate through links 169 (Fig. 1) ears 170 of jaw members 171, on fulcrum 172 carried by the block 160. This rocking of the members 171 is toward closing position about the blank suspended in the open blank mold sections 95, 96, as held by the neck finish sections 117, 118, for the outward travel of the block 160 brings these jaws 171 into proper position for such engaging action upon the ware blank. The angular position of the cylinder 167 so disposes the left jaw 171 that its line is nearly radial when open for clearing the blank as it moves in position theretoward.

The power air line 166 to the cylinder 167 has a branch line 173 (Figs. 2, 11) to the upper end of vertical cylinder 174 carried by bracket 175 radially projecting outward from the horizontal cylinder 152 at station three, to overhang the blank mold at this transfer station. This power air in the cylinder 174 forces plunger 176 downward to open the neck finish mold sections 117, 118 (Fig. 13) thereby releasing the bottle top lip or neck finish so that the ware blank may settle down to be suspended by the jaws 171.

The power air line 166 has a branch line 177 to the piston rod end of the cylinder 157 (Figs. 2, 11) causing the piston rod 159 to draw the block 160 toward the column 36, thus carrying the blank as sustained by the jaws 171, away from position below the member 120 to a position over the second table 35. In this recover travel of the block 160, the plunger 164 is automatically reset to cut off the flow of air from the line 162. This resetting of the plunger 164 occurs by its striking the cylinder 157 as an abutment. The plunger 176 is raised simultaneously with the release of the gear 17, by flow of power air from the lines 6, 134, 135, 151, and line 151' to the lower end of the cylinder 174.

While the tooth engagement between the bevel gear 115 and the segment 148 holds the blank mold sections at station three in the true vertical position to permit the delivery of the blank ware therefrom, to insure maintenance of the reverse vertical position while away from the segment 148, each disk 116 (Figs. 11, 12), is provided with a notch 178 into which roller 179 enters for yieldably acting to hold the rotating parts against shifting. The roller 179 is carried by bracket 180 normally thrust upwardly by a spring 181 to have the roller 179 ride on the disk 116 while the segment 148 is in control by engaging the gear 115, but at other times the roller 179 holds the disk 116 by engaging the notch 178. The bracket 180 is slidably mounted in a guide 182 carried by the gear 17 disposed directly below each of the disks 116.

As the shifting of the various rocker valves permits exhausting of the preceding power drive back through such valves, there is also exhaust provision in the distributing valve 39 (Figs. 18, 19). In the valve 39 there is power fluid duct 183 which in the rotation of ported member 184 brings exhaust duct 185 to connect the line 40' with exhaust vent 186, and similarly for the several lines.

The springs 119 reset the neck finish sections 117, 118, as the plunger 176 is raised at station three. (Figs. 13, 17).

The duct 151' has a branch 187 extending to the cylinder 152 (Figs. 2, 11), to thrust the piston rod 153 therefrom, thus resetting the lever 154 in position for opening the next blank mold, while in the travel from this third or transfer station, the segment 148 completes the rotation of the blank mold sections 95, 96, to bring the finish sections below, as at starting. During this orienting of the disks 116, the blank mold sections 95, 96, are yieldably thrust forward toward closing position by the roller 143 riding out of the short radius portion 150 of the cam 147 carried by the column 2 (Figs. 9, 10), causing the links 140 to close the sections 95, 96, and by engagement thereover, also close the sections 117, 118, if the springs 119 have not completed such operation.

The line 187 has a branch 188 (Figs. 2, 11) permitting power air flow to the lower end of vertical cylinder 189 carried by bracket 190 mounted upon the column 36 above the table 35. This causes piston rod 191 to move upward into the cylinder 189 and rock angle lever 192 to engage upstanding pin 193 from crosshead 194, causing an outward travel thereof away from the column 36. The crosshead 194 in this travel operates through links 195 (Fig. 17) connected to ears 196 of an opposing pair of finish mold sections 197 mounted on common pivot pin 198. These half mold sections 197 are thus closed about the suspended blank as held by the jaws 171 at station three.

In the upward travel of the piston rod 191 in the cylinder 189, the piston in the cylinder 189 opens a side vent to permit flow of air from this cylinder 189 by way of line 199 to the piston rod end of the cylinder 167 at station three, thus opening the jaws or pincers 171 for releasing the blank to the mold sections 197 as such mold sections are closed thereabout.

The relatively slow recover travel of the drive cylinder piston rod 24 as regulated by exhaust valve 200 (Figs. 2, 3, 11), permits in due sequence, flow of air from the distributing valve 39 by line 201 to the upper end of the cylinder 189, thus rocking the angle lever 192 back clear of the pin 193 on the next mold apparatus coming into position for receiving a blank at station three.

The drive transmitted to the table 35 from the intermediate gear 32 to the gear 34 on the column 36, in the design of the apparatus herewith, takes two 60° steps clockwise from the third or transfer station where the blank is received from the table 112. At this second step position of the second table 35, or the fourth station of the machine, blowing of the blank to final bottle form may occur. In the travel from the transfer station, the angular position of the cylinder 167 permits such disposal of the inner or right jaw member 171 when open, that the arc of travel of the ware blank from station three in the mold sections 197 is in no wise hindered should the neck finish or bottle lip protrude upward into the plane of such jaw.

The blowing to final form of the ware may be timed with the recover or the idle travel of the piston rod 24 out of the drive cylinder 23. Accordingly the line 47 (Figs. 2, 14) is provided with a branch line 202 extending to the upper end of cylinder 203 carried by arm 204 radially extending from the column 36 at station four. This forces plunger 205 downwardly to rest on the sectional finish mold 197 and have the check valve therein unseated by contact with the finished neck or lip of the bottle, thereby permitting power air from the line 55 to flow by line 206 past reducing valve 207 to the plunger 205 to expand the semi-plastic blank into finished form within the mold sections 197.

A line 208 from the line 202 leads to horizontal cylinder 209 at station four, to thrust its piston rod 210 outward of said cylinder 209 and radially inward toward the column 36, in order that head 211 may embrace projecting lugs 212 of the mold sections 197, thereby serving as a clamp for holding the mold closed during the blowing operation. This cylinder 209 carries an arm 213 projecting over the head 211 as a guide therefor. The cylinder 209 is mounted on auxiliary bracket 214 vertically adjustable by stem 215 mounted on bracket 216 (Fig. 14).

From the line 188 (Figs. 2, 14) extends a line 217 to the lower end of the cylinder 203, effecting lifting of the plunger 205 with automatic closing of the valve therein for cutting off blowing air flow from the line 206. This release of the finish blow head is accordingly timed with the withdrawal of the blow-back-up plunger withdrawal at station two, as well as the release of the gear 17.

The line 22 initiating the inward or drive stroke of the piston rod 24, has through line 48 a branch 218 extending to the inner or piston rod end of the cylinder 209 at station four, thus withdrawing the head 211 from holding the lugs 212 of the mold sections 197 together. Accordingly there is an automatic release of the blowing and holding mechanism of the apparatus at the finish blowing station, permitting the step driving of the apparatus to occur. However, the unclamping of the sections 197 as above described is so timed to lag after the completion of the blowing operation that the blowing air may not open the finish mold. By making the intermediate gear 32 with long teeth, the finish table gear 34 may be adjusted upward therealong to permit the desired location of the table 35 as to the length of the ware being blown. Such positioning of the finish mold sections is taken care of at the holding mechanism by adjusting the stem 215 in the bracket 216.

The take-off or fifth station for the blown or finished ware is herein shown as two 60° steps from the blowing station. The power air line 5 (Figs. 1, 2) has a branch line 219 extending to the upper end of the distributing valve 39 to be timed at the end of the drive stroke of the piston rod 24 to permit flow from the valve 39 by way of line 220 to the upper end of cylinder 221 carried by a guide radially extending from a bracket mounted on the column 36 at station five. This air in the upper end of the cylinder 221 causes tubular piston rod 223 to be lowered.

The line 151 (Figs. 2, 20) has a branch line 227 extending to the upper end of cylinder 228 carried by auxiliary bracket 229 120° from the mold closing cylinder 189 and mounted therewith on the main bracket 190. This power air in the upper end of the cylinder 228 thrusts piston rod 230 downward, rocking angle lever 231 against roller 232. The roller 232 (Fig. 17) is mounted in slide 233 connected by rod 234 to the crosshead 194. The roller 232 in the rotation of the table 35 contacts the non-rotary cam 235 mounted on the column 36. At this delivery or fifth station, the cam 235 has a short radius portion 236 so that the action of the vertical mold opening cylinder 228 may be effective through the adjustable links 195 for releasing the ware.

The line 166 (Figs. 2, 20) has a branch line 237 extending to the lower end of movable cylinder 238 suspended by the piston rod 223. The piston of this cylinder 238 is fast with the tubular piston rod 223, so that this power air forces this cylinder 238 downward. The cylinder 238 has ears 239 having downwardly extending therefrom adjustable yieldable links 240 connected to jaws or pincers 244 for yieldably engaging the ware just below the neck finish. The finished hot ware is accordingly engaged by the pincers or jaws 244 at once the mold sections 197 open, which jaws 244 so hold the ware upright.

A line 245 (Figs. 1, 2) from the distributing valve 39 extends by flexible duct connection to movable valve 246 and from thence by line 247 and past partially closed valve 248 to the lower end of the cylinder 221, thereby causing upward movement of the piston rod 223 with a lifting of the pincer engaged ware clear of its support beneath the mold.

A line 249 (Figs. 1, 2) also from the distributing valve 39, and with the line 245 properly timed during idle travel of the piston rod 24, by simultaneous power air supply by the line 155, extends to the inner end of a horizontally extending cylinder 250 to thrust its piston rod 251 outward away from the column 36, and by a slide 252 movable in a guide 253 carry the valve 246 and the cylinders 221 and 238, as well as the ware sustained thereby, outward clear of the table 35 to be deposited on a travelling endless conveyer 254 (Fig. 1).

A branch line 255 (Figs. 2, 20) from this line 247 extends to the upper end of the cylinder 238, but as pincer closing power air is in the line 237, no opening of the pincers 244 occurs and the ware is held until it is in position over the conveyer 254. The check valve 248 holds the air in the cylinder 221 so that the rod 223 does not settle clear down at the delivery end of the outward travel along the guide 253, when the change of air occurs for opening the pincers 244 and lifting the rod 223. When the slide 253 reaches the limit of its outward travel, stop 256 (Fig. 1) carried by the guide 253, contacts plunger 257 (Fig. 24) in the valve 246 to cut off air flow from the line 245 and permit power air flow from the line 55 by line 258 past valve 246 to line 259 into the lines 255, 247, thus opening the pincers 244 so that the ware is released to rest upon the conveyer 254, and also lifting the rod 223 to clear the pincers from such deposited ware.

The line 188 (Figs. 1, 2) has a branch line 260 extending to the outer or piston rod end of the cylinder 250 for bringing back the delivery mechanism of this take-off device into a position over the table 35 in readiness for a repetition of this automatic operation in delivering succeeding bottles or finished ware away from the machine. Accordingly this recovery travel at the take off is timed with the withdrawal of the lock bar 14, for the line 227 is supplied from the line 6, through the lines 134, 135, 151', 188. In this inward travel of the slide 252, the plunger 257 of the valve 246 is reset by contacting the cylinder 250 as a stop.

The mold sections 197 in traveling the two 60° steps from the take-off or fifth station to the transfer or third station for receiving a blank from the table 112, are partially closed by cam portion 261 (Fig. 17), while after being closed about the blank at the transfer station, in then riding therefrom about the cam 235, a spring 262 about the rod 234 yieldably maintains this closed position. The partial closing of the finish mold sections 197 by riding on the cam 261, leaves a minimum of opening for supplying the blank thereinto, while the remaining short travel distance for completing the closing may occur rapidly without seriously hammering the sections against each other, for the movement is so slight.

A branch line 263 from the line 220 (Figs. 2, 20) extends to the lower end of the vertical cylinder 228, thus causing simultaneously with the downward travel of the piston rod 223, a resetting of the angle lever 231 before the open mold sections 197 leave the take-off station, so that this mold opening device is in readiness for operation upon the arrival of the succeeding 60° step delivered ware.

The various lines into the tops and through the tubular columns 2, 36, and out base openings 264, 265, (Figs. 6, 20) below the platforms or tables may conveniently be of regular pipe or rigid metal tubing, while for facility in clearing or getting about the elements of the various devices, as well as connecting relatively movable or adjustable parts, flexible ducts may be more easily installed, and even hose used, for there is such control of the heat radiation as not to injure the hose. The general exhausting of the power air about the machine assists in dissipating the heat of the molten glass in operation.

To operate the conveyer 254 (Figs. 1, 2,) intermittently with periods of rest during the rest periods of the table 35, from the line 237, there is line 266 extending to cylinder 267 to give its plunger rack 268 driving strokes, while the idle recover stroke is brought about by line 269 from the line 245.

The various devices herein are so interconnected that the sequences at the various stations may be simultaneously observed automatically. The air line 41 which goes to the lock bar cylinder 7 to throw the bar 14 into position to hold the gear 17, and thereby the gears 32 and 34, has branches to the cylinders 87, 91, at station one for the rest position holding to the cylinders 87, 91, at station one for the rest position holding to the cylinders 122 and 129 at station two for the rest position holding. This air at the cylinder 7 has caused a shifting of the lock bar rocker valve 20 so that air may flow to effect the idle or recover travel of the piston rod 24; to the cylinders 209 and 203 at station four for the rest position holding. Accordingly the three rest position stations one, two and four, are cared for when there is power air in the line 49 at the trip valve 50, station one.

As the operator or means supplies the quantity charge into the blank mold sections 95, 96, at station one, a slight striking of the lever 51 to move it against the spring of its stem, will open the valve 50 for air flow to effect shearing off of such molten glass charge by the shears 62 (Fig. 6) to be followed with a driving down of the packing head 78 thereon as the shears are withdrawn. The retarding valve 81 may be adjusted to give the desired brief timing for this packing of the charge in the sections 95, 96, with withdrawal of the head 78 followed by retraction of the pistons out of rest position as to the cylinders 87, 91, at station one; the cylinders 129, 122, at station two; and the cylinder 203 at station four. The sequence for the release of the cylinder 209 at station four occurs simultaneously with the power air for driving stroke of the main cylinder 23. This power air so acting through the lower rocker valve 4 in effecting the freeing of the holding devices at the stations, also goes to the upper end of the lock bar cylinder 7 for releasing the gear 17 and in so doing shifts the rocker valve 20, not only controlling power air flow to the main drive cylinder 23 and the station four cylinder 209, but in the recover or idle stroke travel of the drive cylinder 23 cares for the sequence of operations at the active stations three and five. In the former, the slide 160 first travels (Fig. 11) outward and then the pincers 171 act to engage the ware blank at the reversed blank mold. This is followed by a recover travel of the slide 160 and deposit of the ware blank in a finish mold on the second table 35. At the take off station, there is first a settling down to have the pincers 244 (Fig. 20) engage the finished ware, then there is the lifting and outward travel of the slide 252 along the guide 253 to deposit the ware upon the conveyer 254.

Supplementing this brief description of the operations as occurring at the several stations, there is automatic resetting of all of the devices, so that upon supply of the next charge of molten glass at station one, there may occur automatically a repetition of the simultaneous cycles of operations with the due sequences. With the manual gatherings the supply of charges at station one may occur as rapidly as fifteen times per minute. In full operation of the machine, when a molten glass charge is supplied at station one, there is a partially formed or blown back up blank at station two, a suspended blank ware at station three being delivered to a finish ware mold on table 35. A 60° step clockwise from station three on table 35 is a ware blank in a finish mold. At station four, a ware blank is being blown into final or complete form. A 60° step clockwise from station four on table 35 is a blown and complete finished article of ware. At station five, a completed article of ware is being removed from the bottle making machine or apparatus and being deposited on the conveyer 254 for delivery, say to a leer.

The vertical adjustment of the second table 35, with its gear 34 as readily permitted by the long teeth of the intermediate gear 32, in the taking care of different lengths of ware, is readily accomplished by the insertion or removal of washers below the bearing on the column 36 sustaining the table 34.

The rocker valves may have the power air flow from the bottom inlet by groove 291 (Fig. 16) about the rocker member with staggered branches 292, 293, to lead therefrom so that in one position of the rocker one of the branches is in communication with a delivery line from the valve, while when the other position of the rocker shifts such first branch out of registry and brings the other into registry with the other line from the valve. In this latter position of the valve, assuming it to be the position of the parts in Fig. 16 with power air flow from the line 5, by way of the groove 291 and the branch 293 to the line 6, then the line 41 may exhaust by port 294 to control duct 295, with which duct 295 the line 6 may be in communication by exhaust port 296 at the other position of the rocker valve.

In coming to a position at station one, as guided by the projections 107, 108, from the guide 101, the head 297 (Fig. 15) of the traveling plunger 298 is lifted against the resistance of spring 299 in auxiliary plunger 300, which auxiliary plunger 300 is also lifted against the action of spring 301 in the member 120. The auxiliary plunger may accordingly provide a supplemental seat or ledge on the inner side of the lip in structures where desired, as in milk bottles, for the inner spring 299 acting between the plungers 298, 300, will retain the outer plunger 300 in the ledge forming position, even after the outer spring 301 has withdrawn the inner plunger 298. The inner plunger 298 has duct 302 therethrough permitting puff of air past the valve 110 to lift the glass in its soft state sufficiently so that it may not fall down into the region of the auxiliary plunger 300 in the travel from station one to station two. The spring 301 also holds the inner plunger 298 out of the blank so it may not interfere with transfer at station three.

Pin 303 (Figs. 11, 15) is normally projected outward by spring 304 in position for the plunger 176 to act thereon.

The retarding valve 81 (Fig. 21) has a plunger 305 therein, which in initial operation is moved by air from the line 80 to clear the port, to the line 82 before air flow through the line 82 occurs. The resetting of the plunger 305 occurs by power air from the line 85 which forces the plunger in the reverse limit of travel to clear the line 82.

The blow head 78 has a ball check valve 306 therein, unseated by plunger 307 when the head 78 comes into position over the mold, (Fig. 23).

The plungers 164 and 257, respectively in the transfer slide carried valve 163 and the take-off slide carried valve 246 (Figs. 22, 24) may have adjustable stops as provided by bolts 308 and lock nuts 309. Fig. 22 shows the valve 163 in power air cutting off position at the inner limit of its stroke. The take-off valve 246 (Fig. 24) is shown in position cutting off air from the line 245, while permitting air flow by way of the line 258, as positioned at the outer end of the slide.

This application is a division of my application Ser. No. 250,488, filed Aug. 19, 1918, for glassware forming apparatus.

What is claimed and it is desired to secure by Letters Patent is:

1. Glassware forming mechanism comprising a first rotatable carrier, radially disposed guide way means mounted thereon, a bearing permitting movement of the guide way means as to the carrier, a sectional first mold mounted on the radially remote portion of the guide way means, means reciprocable in the guide way means in addition to the movement of the guide way means as to the bearing for opening the mold, an actuator as to which the guide way means is movable in said bearing, said actuator being operable to effect reciprocation of said reciprocating means in the guide way means, a second carrier eccentric of and rotatable relatively to the first carrier, a second mold on the second carrier for receiving glass from the open first mold on the first carrier, said second carrier mold being movable with the second carrier to approach said open mold on the first carrier, and driving means for rotating said carriers in synchronism to bring said molds simultaneously toward each other.

2. Glassware apparatus comprising a first rotatable carrier provided with a radially disposed bearing, guide way means rotatably mounted in said bearing, a sectional blank mold carried by the guide way means radially beyond the bearing, means reciprocable in the guide way means in addition to the movement of the guide way means as to the bearing for opening the mold, an actuator as to which the guide way means is movable in said bearing, said actuator being operable to effect reciprocation of said reciprocating means in the guide way means, and a second relatively rotatable carrier having a blow mold movable with the second carrier to approach said open blank mold on the first carrier.

3. Glassware forming apparatus comprising a first rotatable carrier provided with a radially disposed bearing, guide means rotatably mounted in said bearing, a sectional mold carried by the outer portion of the guide means radially beyond the bearing, means reciprocable in the guide means in addition to the movement of the guide means as to the bearing for opening the mold, an actuator as to which the guide way means is movable in said bearing, said actuator being operable to effect reciprocation of said reciprocating means in the guide way means, stationary means coacting during carrier movement for rotating the guide means, and a second relatively rotatable carrier having a mold movable therewith to approach said open mold on the first carrier.

4. Glassware forming apparatus comprising a first rotatable carrier provided with a bearing, guide means rotatably mounted in said bearing, a mold carried by the outer portion of the guide means radially beyond the bearing, means reciprocable in the guide means in addition to the movement of the guide means as to the bearing for opening the mold, an actuator as to which the guide way means is movable in said bearing, said actuator being operable to effect reciprocation of said reciprocating means in the guide way means, driving means coacting to give the carrier determined travel, stationary means coacting in a limited region of carrier travel for there rotating the guide means, and a second relatively rotatable carrier having a mold movable therewith to approach said open mold on the first carrier.

5. Glassware forming apparatus comprising a first rotatable carrier provided with a bearing, guide means rotatably mounted in said bearing, a mold carried by the outer portion of the guide means radially beyond the bearing, means reciprocable in the guide means in addition to the movement of the guide means as to the bearing for opening the mold, an actuator as to which the guide way means is movable in said bearing, said actuator being operable to effect reciprocation of said reciprocating means in the guide way means, driving means coacting to give the carrier a partial rotation, stationary means extending to be engaged by the guide means for rotating the guide means in the bearing, a holding device coacting to hold the guide means from rotation when away from the stationary means, and a second relatively rotatable carrier having a mold movable therewith to approach said open mold on the first carrier.

6. Glass blowing apparatus comprising a first rotatable carrier, driving means effecting partial rotation of the carrier, a stationary toothed segment, guide means rotatably mounting said carrier and provided with a gear disposed to come into engagement with the segment, a mold carried by the outer portion of the guide means radially beyond the gear means reciprocable in the guide means in addition to the movement of the guide means with the gear for opening the mold, an actuator as to which the guide way means is movable in said bearing, said actuator being operable to effect reciprocation of said reciprocating means in the guide way means, and a second relatively eccentric rotatable carrier having a mold movable therewith to approach said open mold on the first carrier.

7. A bottle blowing machine comprising main and auxiliary neck plungers, a rotatable revoluble mounting therefor, a mold carried by the mounting, a fixed guide, and a power control device for rotating the mounting and plungers, said guide coacting to direct the main plunger into operable position as to the mold as said plunger is carried along said guide by the mounting.

8. A bottle blowing machine comprising main and auxiliary neck plungers independently movable, a traveling mounting therefor, a spring disposed between the plungers for retaining the auxiliary plunger in operative position, a second spring normally withdrawing the main plunger from operative position, and a fixed guide for directing the main plunger into operative position.

9. Glass blowing apparatus comprising a pair of laterally spaced rotary tables having gears, an intermediate driving gear effecting the travel of said tables as to each other by actuating said table gears, and means for adjusting one of said tables up and down as to the other and independently of disturbing the gear coaction therewith.

10. Glass blowing apparatus comprising a blank forming first table, power driving means for rotating the table, a finished ware blowing second rotatable table eccentric of said first table, a blank mold carried by the first table, a blow mold carried by the second table, said molds being movable with their respective tables to approach each other, and means for adjusting the height of one of said tables as to the other independently of adjusting the driving means whereby the planes of travel in approach between the molds may be adapted to the sizes of the molds used.

11. Glassware forming apparatus comprising movable molds each provided with a sectional neck and a sectional blank portion, springs normally holding the neck portion closed, a vertical column, a carrier rotatable during mold movement by the carrier to position, and during period of rest, to hold the neck portion below the blank portion of the mold, means for forming the neck, means coacting during mold movement to bring the neck above the blank portion of the mold and so hold for a period of rest, first opening means for the blank portion of the mold, and second opening means for the neck portion, said opening means each coacting with the different molds as brought to position the neck above the blank portion.

12. A bottle blowing machine including a traveling mold provided with neck finish means including a plunger, a spring normally holding the plunger away from entering said mold, and stationary means having guide prongs overcoming said spring and thrusting the plunger into the mold as said mold travels to a position of rest.

13. Glassware forming apparatus comprising a column, an annular series of molds each embodying neck and blank mold sections carried by the column, a bearing for each mold, said bearing having teeth, a stationary toothed segment as to which the bearings in revolving about the column axis may come into mesh for rotation, and power control mechanism determining a rest for each bearing medially of the segment for segment holding of the sections inverted and mechanism including mold opening means at said medial rest position for successively opening the mold sections for neck mold section holding of blanks, said mold in traveling to said position of rest moving as to said mold opening means.

14. A blank orienting device for glass manufacturing apparatus embodying a rotatable carrier, a radial bearing mounted on the carrier, a sleeve in the bearing, a sectional mold carried by the sleeve, stationary means coacting with the sleeve between the mold and the end of the bearing remote from the carrier axis for rotating the sleeve and mold, a mold opening plunger through the sleeve, and a fixed guide holding the plunger against mold opening travel except in a limited region.

15. A blank orienting device for glass manufacturing apparatus embodying a rotatable carrier, a radial bearing mounted on the carrier, a sleeve in the bearing, a sectional mold carried by the sleeve, stationary means coacting with the sleeve between the mold and the end of the bearing remote from the carrier axis for rotating the sleeve and mold, a mold opening plunger through the sleeve, and a fixed guide permitting opening of the mold at a definite position of the carrier and coacting through the plunger for closing the mold as the carrier travels therefrom.

16. A blank orienting device for glass manufacturing apparatus embodying a column, a rotatable carrier mounted upon the column, a radial bearing mounted on the carrier, a sleeve in the bearing, a sectional mold carried by the sleeve, stationary means coacting with the sleeve between the mold and the end of the bearing remote from the carrier axis for rotating the sleeve and mold, a mold opening plunger through the sleeve, and a stationary cam carried by the column and coacting to hold the plunger in mold closing position away from oriented position of the blank.

17. A blank orienting device for glass manufacturing apparatus embodying a column, a rotatable carrier mounted upon the column, a radial bearing mounted on the carrier, a sleeve in the bearing, a sectional mold carried by the sleeve, stationary means coacting with the sleeve between the mold and the end of the bearing remote from the carrier axis for rotating the sleeve and mold, a mold opening plunger through the sleeve, and a stationary cam carried by the column and having a portion permitting plunger operation for opening the mold at inverted position of the mold and coacting to close the mold in mold travel therefrom.

18. A glass manufacturing device embodying a traveling carrier, a sectional mold, and means for partially closing the mold to receive an article to be formed and subsequently completing the closing of the mold as the article is charged thereinto.

19. A glass manufacturing machine including a rotatable carrier, a sectional mold carried thereby, a column mounting the carrier and provided with a stationary cam coacting in mold travel for partially closing the mold, and additional means to complete closing of the mold when the object to be formed is supplied thereto.

20. Glass blowing apparatus comprising laterally adjacent relatively eccentric rotatable carriers, driving means effecting partial rotation of the carriers, a stationary toothed segment above one of the carriers, guide means rotatably mounted on one of said carriers and provided with a gear disposed to come into engagement with the segment, a mold carried by the outer portion of the guide means radially beyond the gear, reciprocable means in the guide means in addition to the movement of the guide means with the gear, and a rocker arm for actuating the reciprocable means to effect opening of the mold in proximity to the other carrier.

21. Glass blowing apparatus comprising laterally adjacent relatively eccentric first and second rotatable carriers, driving means effecting partial similar direction of rotation of the carriers, a stationary segment having its toothed portion extending downward toward the first carrier, guide means rotatably mounted on the first carrier and provided with a gear disposed to come into engagement with the segment, a mold carried by the outer portion of the guide means radially beyond the gear, reciprocable means in the guide means in addition to the movement of the guide means with the gear, and a rocker arm for actuating the reciprocable means to effect opening of the mold in proximity to the other carrier.

22. Glass blowing apparatus comprising a column, a carrier mounted for intermittent rotation on said column, driving means for the carrier, a stationary segment carried by the column above the carrier with teeth toward the carrier, guide means rotatably mounted on the carrier and provided with a gear to be engaged by the segment teeth, a mold carried by the outer portion of the guide means radially beyond the gear, reciprocable means in the guide means in addition to the movement of the guide means with the gear, and a rocker arm for actuating the reciprocable means to effect opening of the mold.

23. Glass handling apparatus embodying a rotary carrier, an annular series of bearings on said carrier, mold mounting members in said bearings, a pair of mold sections provided with pivotal connection to a member at each bearing, a control connection through each bearing for opening the mold section pair at said bearing by swinging said pair of mold sections apart, driving means for the carrier providing a station of rest, and actuating means mounted at said station of rest into position as to which the respective mold opening control connections may come into registry, said operating means including a lever rockable in one direction as to said bearing as in position at said station of rest to cooperate with its control connection for swinging apart the pair of mold sections as carried thereby.

24. Glass handling apparatus embodying a rotary carrier provided with an annular series of bearings, a member mounted for rotation in each bearing, a pair of mold sections provided with a pivotal connection to said member at each bearing, driving means for the carrier and members providing a station of rest, control means shiftable axially of a bearing at the station of rest for effecting opening of the mold section pair carried by said bearing, as movable into registry therewith, and a rockable actuator for said means.

25. Glass handling apparatus comprising a pair of opposing mold sections, a mold orienting pivotal mounting for the mold sections, a rotary carrier for the mounting providing a station of rest, an actuator including a rockable member as to which member the carrier is movable to bring said mold to the station of rest and as to which member said mold is oriented, and a control for rendering said actuator effective for opening the oriented mold at said station of rest.

26. Glass handling apparatus comprising a column, a carrier having step by step rotation on said column to provide a station of rest, a cylinder fixed with said column, a piston reciprocable in said cylinder to effect radial shifting of a seat at said station of rest, a pair of mold sections, a mold section orienting mounting to which the mold section pair is pivotally connected, control means providing a seat and a lever to be rocked by said piston, said means being thereby operable to swing the mold sections into mold opening position at said station of rest, and mold closing means as to which this mold opening means is movable.

27. Glass handling apparatus comprising a column, a carrier having step by step rotation on said column to provide a station of rest, a pair of mold sections, a mold section orienting mounting to which the mold section pair is pivotally connected, a control rod, a cam fixed with the column and coacting through said rod to maintain the sections closed away from said station of rest, and rockable means at said station of rest movable relatively to said cam for actuating said rod to swing the mold sections as to their mounting.

28. Glass handling apparatus comprising a column, a rotary carrier providing a station of rest, a pair of mold sections, a mold section mounting on the carrier providing pivotal connections for the sections, a control rod reciprocable as to the mounting for opening and closing the mold section pair, a cam fixed with the column and coacting through said rod for maintaining the mold section pair in mold closing position away from said station of rest, and horizontal axis rockable means at said station of rest coacting through the rod for effecting swinging of the sections into mold opening position.

29. Glass forming apparatus embodying a column, a rotary carrier on said column providing a station of rest, radially disposed bearings in an annular series carried by said carrier, a rotatable mounting member in each bearing, a pair of mold sections pivotally connected to each member, reciprocable control means having connection through each member to the mold section pair carried thereby, a stationary cam carried by the column, said control means including a spring through which said cam is effective for maintaining the mold section pairs in closed position away from said station of rest, and a rockable member as to which the carrier is movable, said member as rocked operable to effect opening of the mold section pair at said station of rest.

30. Glass forming apparatus embodying a column, a rotary carrier on said column providing a station of rest, radially disposed bearings in a horizontal plane in an annular series carried by said carrier, a rotatable mounting member in each bearing, a pair of mold sections pivotally connected to each member outward from said column, reciprocable control means having connection through each member to the mold section pair carried thereby, a cam carried by the column, said control means including a spring through which said cam is effective for maintaining the mold section pairs closed away from said station of rest, a bearing having its axis extending transversely of the line of reciprocation of the control means, and a rockable member mounted in said bearing and operable in sequence with said carrier at said station of rest for opening the mold section pair at said station of rest.

31. Glass forming apparatus embodying a column, a rotary carrier on said column providing a station of rest, bearings disposed in a horizontal direction in an annular series and carried by said carrier, a rotatable mounting member in each bearing, a pair of mold sections pivotally connected to each member outward from said column, means coacting away from said station of rest for rotating the members in their respective bearings, for each bearing a reciprocable control means provided with connection to the mold section pair of said bearing, a cam carried by the column, said respective control means each including a spring through which said cam is effective for maintaining the mold sections yieldably closed away from said station of rest, and a rockable member as to which the carrier is movable, said member as rocked effective for shifting the control means at the station of rest relatively to the cam for effecting mold section opening.

32. Glass forming apparatus embodying a pair of columns, a blank carrier on said first column, a blow carrier on said second column, common driving means for both carriers simultaneously providing a station of rest therebetween as a transfer station, one of said columns having its carrier provided with an annular series of mold mountings, a pair of mold sections pivotally connected to each of said mountings, control means for each pair of said sections, a cam fixed with said column and coacting through said control means as independently coacting therewith to hold the mold sections closed in certain angular positions of the carrier away from said transfer station of rest, and a lever having a depending arm movable relatively to said cam and coacting with a control means as at said station of rest for opening the mold section pair as at said station of rest.

33. Glass handling apparatus comprising a column, a carrier having step by step rotation on said column to provide a station of rest, a cylinder fixed with said column, a piston reciprocable in said cylinder to effect radial shifting of a seat at said station of rest, a pair of mold sections, a mold section orienting mounting to which the mold section pair is pivotally connected, control means providing said seat, a rockable member engaging said seat and shifted by said piston, said means being thereby operable to swing the mold sections into mold opening position at said station of rest, and a mold closing cam as to which this mold opening means is movable.

34. Glass handling apparatus comprising a column, a carrier having step by step rotation on said column to provide a station of rest, a pair of mold sections, a mold section orienting mounting to which the mold section pair is pivotally connected, a control rod, a cam fixed with the column and coacting through said rod to maintain the sections closed away from said station of rest, and a piston and cylinder device including a lever at said station of rest movable relatively to said cam for actuating said rod to swing the mold sections as to their mounting.

35. Glass handling apparatus comprising a column, a rotary carrier providing a station of rest, a pair of mold sections, a mold section mounting on the carrier providing pivotal connections for the sections, a control rod reciprocable as to the mounting for opening and closing the mold section pair, a cam fixed with the column and coacting through said rod for maintaining the mold section pair in mold closing position away from said station of rest, and a piston and cylinder device including a lever having a radially movable arm at said station of rest coacting through the rod for effecting swinging of the sections into mold opening position.

36. Glass forming apparatus embodying a column, a rotary carrier on said column providing a station of rest, radially disposed bearings in an annular series carried by said carrier, a rotatable mounting member in each bearing, a pair of mold sections pivotally connected to each member, reciprocable control means having connection through each member to the mold section pair carried thereby, a stationary cam carried by the column, said control means including a spring through which said cam is effective for maintaining the mold section pairs in closed position away from said station of rest, and a piston and cylinder device embodying a lever operable on said control means to effect opening of the mold section pair at said station of rest.

37. Glass forming apparatus embodying a column, a rotary carrier on said column providing a station of rest, radially disposed bearings in a horizontal plane in an annular series carried by said carrier, a rotatable mounting member in each bearing, a pair of mold sections pivotally connected to each member outward from said column, reciprocable control means having connection through each member to the mold section pair carried thereby, a cam carried by the column, said control means including a spring through which said cam is effective for maintaining the mold section pairs closed away from said station of rest, a cylinder, a piston for said cylinder operable in sequence with said carrier at said station of rest, and a lever actuable by said piston for opening the mold section pair at said station of rest.

38. Glass forming apparatus embodying a column, a rotary carrier on said column providing a station of rest, bearings disposed in a horizontal direction in an annular series and carried by said carrier, a rotatable mounting member in each bearing, a pair of mold sections pivotally connected to each member outward from said column, means coacting away from said station of rest for rotating the members in their respective bearings, for each bearing a reciprocable control means provided with connection to the mold section pair of said bearing, a cam carried by the column, said respective control means each including a spring through which said cam is effective for maintaining the mold sections yieldably closed away from said station of rest, and a piston and cylinder device including a rockable member for shifting the control means at the station of rest relatively to the cam for effecting mold section opening.

39. Glass forming apparatus embodying a pair of columns, a blank carrier on said first column, a blow carrier on said second column, common driving means for both carriers simultaneously providing a station of rest therebetween as a transfer station, one of said columns having its carrier provided with an annular series of mold mountings, a pair of mold sections pivotally connected to each of said mountings, control means for each pair of said sections, a cam fixed with said column and coacting through said control means as independently coacting therewith to hold the mold sections closed in certain angular positions of the carrier away from said transfer station of rest, and a piston and cylinder device including a rockable member movable relatively to said cam and coacting with a control means as at said station of rest for opening the mold section pair as at said station of rest.

In witness whereof I affix my signature.

FRANK O'NEILL.